United States Patent [19]

Debaigt

[11] 4,062,166
[45] Dec. 13, 1977

[54] SUPPORT GRATING FOR EQUIPMENT BOXES

[75] Inventor: Jean Debaigt, Maisons Laffitte, France

[73] Assignee: CGEE Alsthom S.A., Perret, France

[21] Appl. No.: 668,790

[22] Filed: Mar. 19, 1976

[30] Foreign Application Priority Data

Mar. 25, 1975 France .................................09325

[51] Int. Cl.² .............................................. E04C 2/42
[52] U.S. Cl. ......................................... 52/664; 52/666; 217/31; 220/22.3
[58] Field of Search ................. 52/666, 667, 668, 664; 220/22, 22.1, 22.2, 22.3 X; 217/30, 31 X, 32, 33, 7

[56] References Cited

U.S. PATENT DOCUMENTS

| 562,370 | 6/1896 | Booz | 220/22.1 |
| 654,508 | 7/1900 | Bohn | 217/32 |
| 2,486,743 | 11/1949 | Haffner | 217/31 |
| 2,918,995 | 12/1959 | Kruger | 217/31 |
| 3,120,413 | 2/1964 | Scotti | 217/31 |
| 3,494,498 | 2/1970 | Atherton | 217/33 |

FOREIGN PATENT DOCUMENTS 1,578,829 7/1969 France ................................. 52/664

Primary Examiner—Ernest R. Purser
Assistant Examiner—Henry Raduazo

[57] ABSTRACT

Support grating for electrical equipment boxes having a format which is a multiple of basic elementary dimensions, constituted by a grid formed by cooperating frame members connected together two by two by distance pieces, wherein the frame members comprise periodic transversal cut-away parts constituted by slots or notches, an intermediate cut-away part and a lower port, the sides of the distance pieces comprise protuberances and bosses, for cooperation with the cut-away parts in a rigid assembly which is locked by the bosses in the cut-away parts.

4 Claims, 10 Drawing Figures

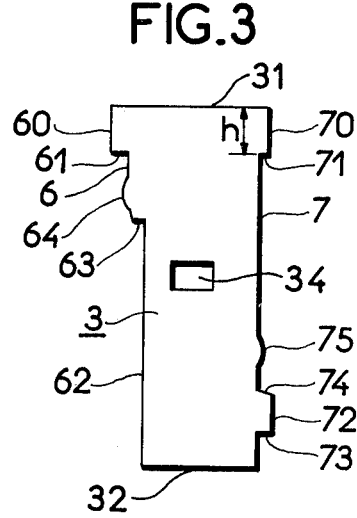
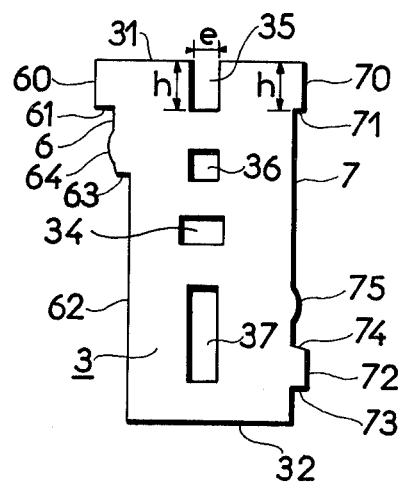
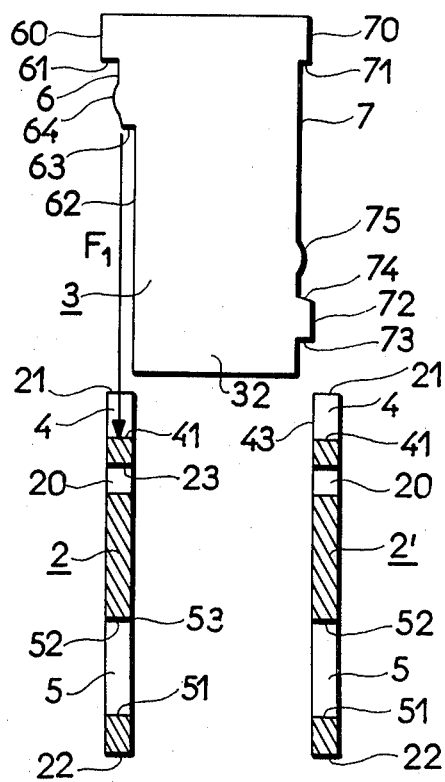

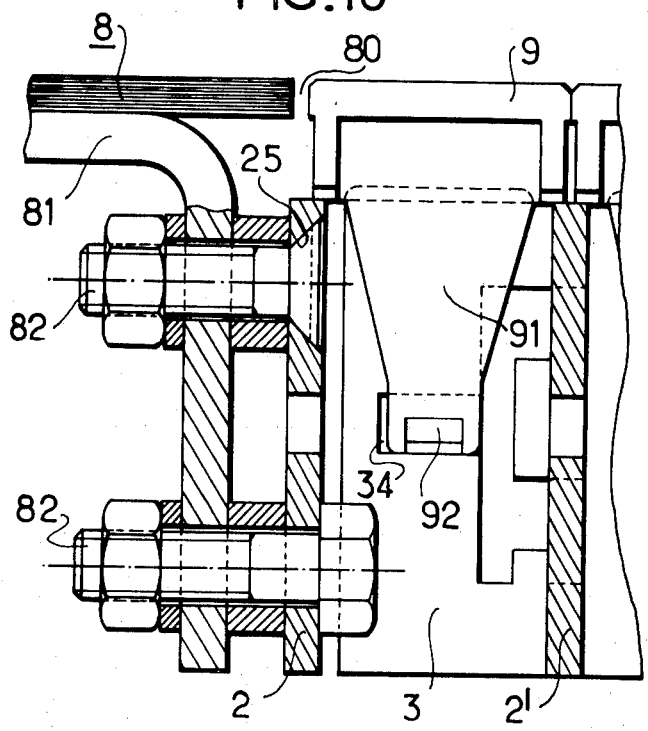

SUPPORT GRATING FOR EQUIPMENT BOXES

FIELD OF THE INVENTION

The invention relates to a grating, e.g. for supporting electrical equipment boxes, whose dimensions are multiples of a basic dimension.

BACKGROUND

At the time of the assembling of a switch-board or of a console for controlling an electrical installation, circumstances make it preferable to frequently arrange, side by side, equipment boxes such as control boxes, indicator boxes, measuring devices etc. These boxes are normally rectangular in shape and are frequently made with dimensions which are multiples of a basic elementary dimension. The juxtaposing of those boxes leads, then, to the constituting of a mosaic of boxes.

The implanting of such as mosaic requires a support constituted by a grating whose openings must be able to adapt themselves easily to the composition of the mosaic to be formed or, even, to subsequent modifications.

The various types of gratings which have been proposed to solve that problem have revealed a certain number of disadvantages. Thus, the components of those gratings require a fitting of the elements into one another, entailing an articulation which has excessive rotation or deformation, or, even, fairly complicated handling and, on the other hand, the seating of the elements arranged end to end is not well ensured because of the indispensible installing play. The result of this is a difficulty in assembling elements having a fairly great width or when modifying a pre-existing assembly. Moreover, the rigidity of such an assembly often leaves room for improvement.

SUMMARY OF THE INVENTION

An object of the invention is to form a grating in which the assembling of one element to another given element is effected normally with a slight deformation of that element, ensuring good rigidity in assembling and with easy manipulation.

The invention contemplates a support grating for equipment boxes, constituted by a grid formed in cooperation by distance pieces connecting together, two by two, parallel frame members facing each other and each having an upper edge and a lower rim, edge distance pieces each comprising a first side co-operating with one of the two frame members, called the first frame member, and a second side co-operating with the other frame member, called the second frame member, an upper edge and a lower edge, the frame memebers comprise, along their length, periodic transversal cut-away parts comprising, identically, a first cut-away, called the upper cut-away part, constituted by rectangular slots or notches in the upper edge having bottoms which are parallel to the upper edge and a width equal to the thickness of the distance pieces, a second cut-away part having edges arranged parallel to bottom of the slots and a third cut-away part called the lower cut-away part, constituted by rectangular ports having a width equal to the thickness of the distance pieces, arranged in alignment with the slots and limited at their lower ends by lower edges arranged near to and facing the lower edge of the frame member and at their upper ends by upper edges. The first side of each distance piece comprises, identically, at its upper part, an upper protuberance whose height is equal to the depth of the slots, extending to the upper edge of the distance piece, and a lower clearance extending up to the lower edge of the distance piece. The second side of each distance piece comprises, identically, at its upper part, an upper protuberance whose height is equal to the depth of the slots and extending to the upper edge of the distance piece, and a lower protuberance limited by a lower side parallel to the lower edge of the distance piece, and an upper side. Finally, the first side is provided with a first boss near the upper edge of the distance piece and the second side is provided with a second boss near the lower edge of the distance piece, in such as way that, at the time of the installing of the distance pieces, the upper protuberances engage the slots of the frame members, each first boss is locked against the edger of the second cut-away part of the first frame member, each second boss is locked against an upper edge of a port of the second frame member, and each lower protuberance of the second side is engaged against a lower edge of said port.

According to a further, optical characteristic, a distance piece arranged between the two frame members can constitute itself a frame member for the other distance piece.

According to another characteristic, the distance pieces and the frame members can be made from a metallic strip of a light alloy.

The characteristics and advantages of the invention will become apparent from the description of an embodiment given by way of an example and illustrated in the drawings.

BRIEF DESCRIPTION OF THE DRAWINGS

FIG. 3 is a front view of an elementary distance piece;

FIG. 4 is a front view of a variant of a distance piece;

FIGS. 5 to 8 are transversal cross-section views of the frame members showing the successive phases of the inserting of a distance piece between those frame members;

FIG. 10 shows a method of using a grating according to the invention.

DETAILED DESCRIPTION

Figure 1:
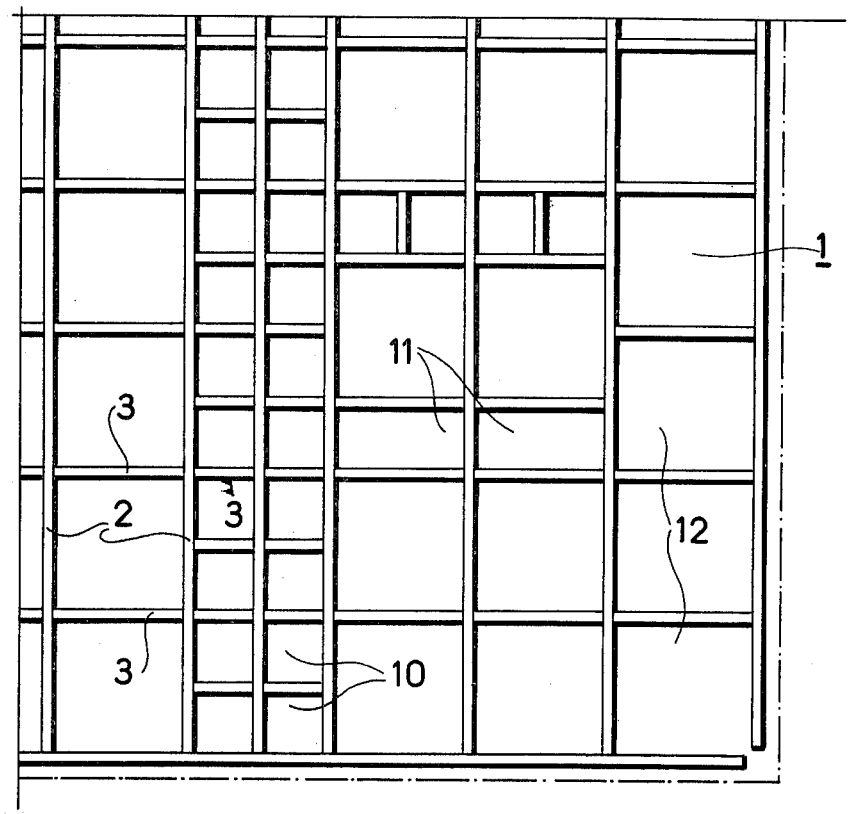
FIG. 1 is a partial top view of a grating assembly according to the invention.

In the figures, a grating assembly 1 is constituted by frame members 2 arranged parallel, face to face and connected by distance pieces 3. The frame members 2 and the distance pieces 3 form a grid having opening such as 11 and 12, with dimensions which are multiples of those of an elementary opening 10, the mesh 11 having one double length and the opening 12 having two double lengths.

Each frame member 2 is constituted by a metallic strip made of a rigid light alloy, with an upper edge or rim 21 and a lower edge or rim 22. Each frame member is provided along its length with, periodic cut-away parts constituted by three elementary cut-away parts, namely, a first cut-away part 4, called an upper cut-away part, a second cut-away part 20, called a intermediate cut-away part, and a third cut-away part 5, called the lower cut-away part.

The first cut-away part is constituted by a rectangular slot or notch 4 in the upper rim 21 of the frame member. The cut-away part has a bottom edge 41 parallel to rim 21 and, a width equal to the thickness e of a distance piece 3.

The second cut-away part 20 has a rectangular shape with an upper edge 23 arranged parallel to and facing the bottom edge 41, and a lower edge 24 parallel to the upper edge 23.

The third cut-away part, which is constituted by a rectangular port 5 and has a width equal to the thickness e of a distance piece, is arranged in aligment with the slot 4. It is limited at its lower end by a lower edge 51 arranged near to and facing the lower rim 22 of the frame member and at its upper end by an upper edge 52.

Each distance piece 3 is constituted by a length of a metallic strip made of the same light rigid alloy as the frame members, having an upper edge 31 and a lower edge 32. The distance pieces are limited by a first side 6 and a second side 7 and have the same thickness e. The first side 6 of each distance piece comprises, identically, at its upper part, an protuberance 60 whose height h is equal to the depth of the slots 4 and extends from a shoulder 61 to the upper edge 31 of the distance piece. The side 6 comprises, at its lower part, a clearance 62 limited by a shoulder 63 of the side 6 and extending to the lower edge 32 of the distance piece. Above the shoulder 63, the side 6 is provided with a boss 64.

The second side 7 of each distance piece comprises, identically, at its upper part, an upper protuberance 70 whose height h is equal to the depth of the slots 4 and extending from a shoulder 71 to the upper edge 31 of the distance piece. The second side 7 comprises, at its lower part, a protuberance 72 limited by a lower side 73 parallel to the lower edge 32 of the distance piece and an upper side 74. The side 7 is provided, above the side 74, with a boss 75.

The successive phases for the assembling of a distance piece in relation to the frame members are shown in FIGS. 5 to 9.

Firstly, the distance piece 3 is brought near first frame member 2 and a second frame member 2', arranged parallel to each other and spaced apart by a distance equal to that existing between the edges 6 and 7 of the distance piece 3.

The periodic cut-away parts of the two frame members being arranged in alignment, the distance piece 3 is placed in a transversal plane containing two of those cut-away parts. The lower edge 32 is then brought to the level of the upper rims 21 of the frame members 2 and 2', the clearance 62 of the first side 6 is brought flush and in contact with the inside wall of the frame member 2, the end of the protuberance 72 of the second side 7 being flush with the inside wall of the frame member 2'; that position is shown in FIG. 5. The distance piece 3 is then made to undergo a first linear movement in the transversal plane in the direction of the arrow F1.

Figure 6:
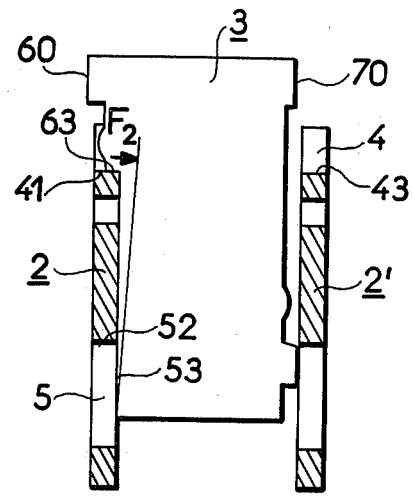

The position obtained is then that shown in FIG. 6. The shoulder 63 of the side 6 is pressed against the bottom 41 of the slot 4 of the frame member 2. Starting from that position, the distance piece 3 is made to undergo a first tilting movement while bearing against the ridge 53 formed by the edge 52 of the port 5 with the inside wall of the frame member 2; the tilting is in the direction shown by the arrow F2.

Figure 7:
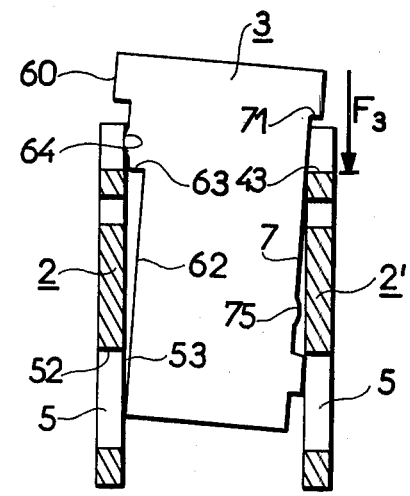

The position is then reached as shown in FIG. 7. The upper part of the side 7 of the distance piece 3 is pressed against the ridge 43 formed by the bottom 41 with the inside wall of the frame member 2' and the shoulder 63 of the side 6 is cleared in relation to the the inside wall of the frame member 2. From that position, the distance piece 3 is made to undergo a second linear movement in the direction shown by the arrow F3 till the shoulder 71 abuts against the bottom 41 of the slot 4 of the frame member 2'.

Figure 8:
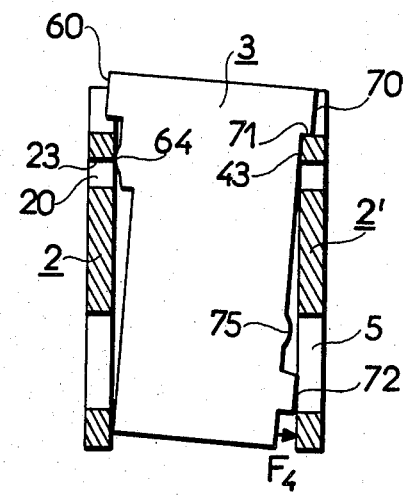
Figure 9:
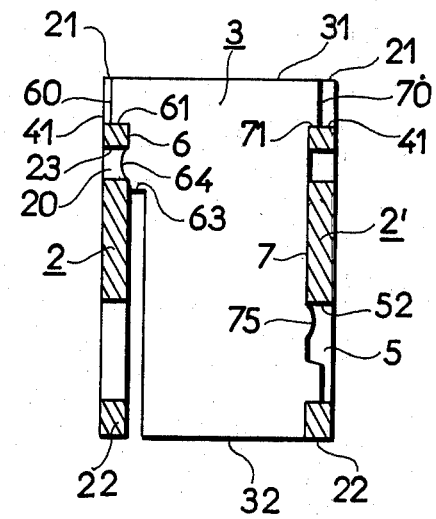
FIG. 9 is a transversal cross-section view of the frame members, showing the final assembling position of the distance piece.

The position reached is then that shown in FIG. 8. From that position, the distance piece is made to undergo a second tilting about the ridge 43; the tilting is shown by the arrow F4.

Due to a slight elastic deformation of the frame members 2 and 2', during that tilting, simultaneously, the boss 64 slides along the inside wall of the frame member 2 to become locked against the upper edge 23 of the intermediate cut-away part 20, the protuberance 72 of the side 7 becomes recessed in the port 5 of the frame member 2' and the boss 75 of the side 7 becomes locked against the upper edge 52 of the port 5. This is then the final assembling position shown in FIG. 9. The shoulder 61 of the protuberance 60 is applied against the bottom 41 of the slot 4 in the frame member 2 and the shoulder 71 of the protuberance 70 is applied against the bottom 41 of the slot 4 in the frame member 2'. The side 6 is applied against the inside wall of the frame member 2 and the side 7 is applied against the inside wall of the frame member 2'. The assembly thus obtained, which requires only a slight elastic deformation of the frame members at the time of the locking, provides good rigidity.

FIGS. 5 to 9 show an elementary distance piece such as that shown in FIG. 3. But it is just as possible to use a distance piece such as that shown in FIG. 4 and comprising at least a transversal cut-away part identical to the periodic cut-away parts of the frame members. Such a cut-away part is constituted by a slot 35, an intermediate cut-away part 36 and a port 37. In those conditions, such a distance piece can itself be used as a frame member for another distance piece assembled perpendicular to that distance piece.

In practice, distance pieces having the same thickness as that of the frame members are used, this making it possible to make them with the same metal strips of light alloy.

Figure 2:
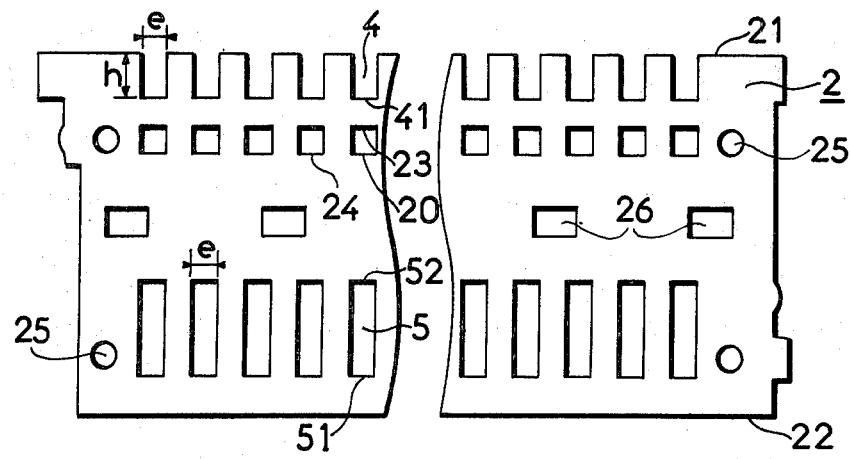
FIG. 2 is a longitudinal view of a frame member according to the invention.

In FIG. 10, a console comprising an opening 80 intended for accomodating a grating, consisting of frame members such as 2 and 2', connected together by distance pieces such as 3, has been designated as 8; the frame member 2 is fixed to a support 81 in the form of an angle iron, integral with the console 8. For that purpose, the frame member 2 is drilled with fixing holes 25 for screws 82. An indicator window 9 has been inserted on the upper face of the opening constituted by means of the frame members 2 and 2' and of the distance piece 3. The window 9 has, on the hidden face of its lower body, a resilient lateral tab 91 bearing a boss 92 co-operating with a slot 34 formed through the distance piece 3. By rotation through ninety degrees of the window, the boss 92 could co-operate with a slot such as 26 (FIG. 2) formed through a frame member. It is thus possible to form a grating having a format corresponding to the windows by means of frame members and distance pieces corresponding to the dimensions of the windows and to fix them inside the meshes.

The present invention has been described with reference to a preferred embodiment; it is quite evident that without going beyond the scope of the invention, details can be modified and/or certain means can be replaced by equivalent means therein.

I claim:

1. A support grating comprising a grid constituted by parallel frame members arranged in spaced relation and distance pieces engaged with said frame members to hold the same in assembled relation at a predetermined spacing, each said frame member having upper edges and being provided with a vertical array of at least three spaced aperture means including slots at the upper edge, said distance pieces each having opposite vertical sides with at least two vertically offset projections means on each side, said distance piece having a clearance at one side such that the horizontal distance between said one side of said distance piece at said clearance and the second side of the distance piece is less than the spacing between adjacent frame members while the horizontal distance between said projections means is greater than the spacing between said frame members, said distance piece being laterally insertable between said first and second of said frame members at said clearance to a depth at which a projection means at the first side of the distance piece is engaged at the bottom of the slot in the first frame member whereupon said distance piece is pivotably movable in a first direction to enable the distance piece to be laterally inserted further between the frame members until a projection means at the second side is engaged at the bottom of the slot in the second frame member and said distance piece can be pivoted in a second direction opposite the first to engage the projection means at said one side into corresponding aperture means of the first frame member while concurrently engaging the projection means at the other side of the distance means into the aperture means of the second frame member, the position of the projection means and the aperture means being such as to produce slight elastic deformation of the frame members to effect locking of the projection means in the aperture means.

2. A support grating for equipment boxes, comprising, in combination: a grid formed by cooperating distance pieces that interconnect, two by two, parallel frame members that face each other, each frame member having upper and lower rims; said distance pieces having first and second sides cooperating with a first and a second of said frame members; said distance pieces further having upper and lower edges; wherein:

a. said frame members include, along their lengths, periodic transversal cut-away parts having first, upper cut-away parts, second intermediate cut-away parts, and third, lower cut-away parts; said first parts being constituted by rectangular slots in said upper rim, having bottoms that are parallel to said rim and a width equal to the thickness of said distance pieces; said second parts having edges parallel to said bottoms; said third parts being constituted by rectangular ports having a width also equal to the thickness of said distance pieces, and being substantially aligned with said slots and limited at their lower ends by lower edges, arranged near to and facing said lower rim, and limited at their upper ends by upper edges;

b. said first side of each distance piece includes at its upper part an upper protuberance whose height is equal to the depth of said slots, said upper protuberance extending to said upper edge, said first side having a lower clearance extending to said lower edge;

c. said second side of each distance piece includes at said upper part an upper protuberance whose height is also equal to the depth of said slots, said upper protuberance extending to said upper edge, and a lower protuberance limited by a lower side parallel to said lower edge, and an upper side; and d. said first side has a first boss near said upper edge, and said second side has a second boss near said lower edge, the horizontal distance between said first side of said distance piece at said clearance and said second side of said distance piece being less than the spacing between said frame members whereas the distance between the edges of the bosses is greater than spacing between said frame members such that by pivotably inserting the distance piece laterally between the frame members and engaging the upper protuberance in one of said rectangular slots in a first of said frame members, the other upper protuberance can be engaged in a rectangular slot of the second frame member and the first boss can be engaged in one of said second cut-away parts in said first frame member while the lower protuberance and the second boss respectively enter a rectangular port in the first frame member and respectively engage the lower and upper edges therein.

3. The support grating as defined in claim 2, wherein one (3) of said distance pieces is arranged between said two frame members (2, 2') and constituted itself a further frame member for an other (3) of said distance pieces.

4. The support grating as defined in claim 2, wherein the thickness of said distance pieces (3) is equal to that of said frame members (2, 2').

* * * * *